(12) United States Patent
Suggs

(10) Patent No.: US 10,114,512 B2
(45) Date of Patent: Oct. 30, 2018

(54) PROJECTION SYSTEM MANAGER

(71) Applicant: Hewlett-Packard Development Company, L.P., Houston, TX (US)

(72) Inventor: Bradley Neal Suggs, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 21 days.

(21) Appl. No.: 15/025,010

(22) PCT Filed: Sep. 30, 2013

(86) PCT No.: PCT/US2013/062663
§ 371 (c)(1),
(2) Date: Mar. 25, 2016

(87) PCT Pub. No.: WO2015/047401
PCT Pub. Date: Apr. 2, 2015

(65) Prior Publication Data
US 2016/0239154 A1 Aug. 18, 2016

(51) Int. Cl.
*G06F 3/042* (2006.01)
*G06F 1/16* (2006.01)
*G06F 3/0354* (2013.01)
*H04N 9/31* (2006.01)

(52) U.S. Cl.
CPC .......... *G06F 3/0425* (2013.01); *G06F 1/1601* (2013.01); *G06F 3/03545* (2013.01); *H04N 9/3141* (2013.01); *H04N 9/3194* (2013.01)

(58) Field of Classification Search
CPC .. G06F 3/0425; G06F 3/03545; G06F 1/1601; H04N 9/3141; H04N 9/3194
See application file for complete search history.

(56) References Cited

U.S. PATENT DOCUMENTS 5,831,601 A * 11/1998 Vogeley ................. G09G 3/346
345/175
7,023,536 B2 4/2006 Zhang et al.
7,038,846 B2 5/2006 Mandella et al.
(Continued)

FOREIGN PATENT DOCUMENTS

KR 10-2013-0025073 A 3/2013
KR 10-2013-0093408 A 8/2013
(Continued)

OTHER PUBLICATIONS

PCT Search Report/Written Opinion~Application No. PCT/US2013/062663 dated Jun. 30, 2014~12 pages.
(Continued)

*Primary Examiner* — Jose Soto Lopez
(74) *Attorney, Agent, or Firm* — HP Inc. Patent Department

(57) ABSTRACT

An example system in accordance with aspects of the present disclosure includes a projector unit to project an image on to a projector display area on a touch sensitive mat, an all-in-one computer attachable to the projector unit, and a camera communicatively coupled to the all-in-one computer, the camera having a lens with a field of view wider than the projector display area. The touch sensitive mat is communicatively coupled to the all-in-one computer.

13 Claims, 8 Drawing Sheets

(56) References Cited

U.S. PATENT DOCUMENTS

| | | |
|---|---|---|
| 7,088,440 B2 | 8/2006 | Buermann et al. |
| 7,110,100 B2 | 9/2006 | Buermann et al. |
| 7,113,270 B2 | 9/2006 | Buermann et al. |
| 7,161,664 B2 | 1/2007 | Buermann et al. |
| 7,203,384 B2 | 4/2007 | Carl et al. |
| 7,268,956 B2 | 9/2007 | Mandella et al. |
| 7,474,809 B2 | 1/2009 | Carl et al. |
| 7,479,949 B2 | 1/2009 | Jobs et al. |
| 7,599,561 B2 | 10/2009 | Wilson et al. |
| 7,710,391 B2 | 5/2010 | Bell et al. |
| 7,729,515 B2 | 6/2010 | Mandella et al. |
| 7,787,706 B2 | 8/2010 | Yee |
| 7,800,592 B2 | 9/2010 | Kerr et al. |
| 7,826,641 B2 | 11/2010 | Mandella et al. |
| 7,961,909 B2 | 6/2011 | Mandella et al. |
| 8,121,640 B2 | 2/2012 | Russ et al. |
| 8,199,117 B2 | 6/2012 | Izadi et al. |
| 8,284,165 B2 | 10/2012 | Koshiyama et al. |
| 8,736,583 B2 | 5/2014 | Anderson et al. |
| 2004/0183775 A1* | 9/2004 | Bell ............. G06F 3/011 345/156 |
| 2005/0078092 A1 | 4/2005 | Clapper |
| 2005/0168437 A1 | 8/2005 | Carl et al. |
| 2008/0018591 A1 | 1/2008 | Pittel et al. |
| 2011/0227915 A1 | 9/2011 | Mandella et al. |
| 2011/0242054 A1 | 10/2011 | Tsu |
| 2012/0038549 A1 | 2/2012 | Mandella et al. |
| 2012/0044143 A1* | 2/2012 | Newton ............. G06F 1/1616 345/161 |
| 2012/0182216 A1* | 7/2012 | Takamatsu ........... G06F 3/005 345/157 |
| 2013/0077236 A1 | 3/2013 | Becze et al. |
| 2013/0082967 A1 | 4/2013 | Hillis et al. |
| 2013/0194418 A1 | 8/2013 | Gonzalez-Banos et al. |
| 2013/0215229 A1* | 8/2013 | Yerli ............. H04N 13/0207 348/46 |
| 2014/0246573 A1* | 9/2014 | Takeda ............. H04N 9/3129 250/235 |
| 2014/0292647 A1* | 10/2014 | Murase ............. G03B 17/54 345/156 |
| 2015/0058782 A1* | 2/2015 | Kutliroff .......... G06F 3/04815 715/773 |
| 2015/0089453 A1* | 3/2015 | Dal Mutto .......... G06F 3/017 715/852 |

FOREIGN PATENT DOCUMENTS

| | | |
|---|---|---|
| KR | 10-2013-0105211 A | 9/2013 |
| WO | WO-2012/070950 A1 | 5/2012 |
| WO | WO-2013/019255 A1 | 2/2013 |

OTHER PUBLICATIONS

Shahram et al., "Going Beyond the Display: A Surface Technology with an Electronically Switchable Diffuser," Jul. 11, 2008, pp. 1-10, research.microsoft.com Shahram et al., "C-Slate: A Multi-Touch and Object Recognition System for Remote Collaboration using Horizontal Surfaces," 2nd IEEE Int'l Wkshop, 2007 Tabletop, 8 pgs.

Gao, Rui et al; Microsoft Research-Mobile Surface; Microsoft Research; 2010; http://research.microsoft.com/en-us/projects/mobilesurface/.

Hand, Randall; Infinite Z Launches zSpace Virtual Holographic 3D Display for Designers; VizWorld.com; Dec. 13, 2011; http://www.vizworld.com/2011/12/infinite-launches-zspace-virtual-holographic-3d-display-designers/#sthash.j6Ys61PX.dpbs.

Harrison, B. et al.; Bringing Toys to Life: Intel Labs Oasis Project; Augmented Engineering; Jan. 26, 2011; http://augmentedengineering.wordpress.com/2011/01/26/bringing-toys-to-life-intel-labs-oasis-project/.

Harrison, Chris et al; OmniTouch: Wearable Multitouch Interaction Everywhere; UIST'11; Oct. 16, 2011; Santa Barbara, California; http://research.microsoft.com/en-us/um/people/awilson/publications/HarrisonUIST2011/HarrisonUIST2011.html.

Hartmann, Bjorn et al; Pictionaire: Supporting Collaborative Design Work by Integrating Physical and Digital Artifacts; CSCW 2010; Feb. 6, 2010; Savannah, Georgia; http://research.microsoft.com/en-us/um/people/awilson/publications/HartmannCSCW2010/HartmannCSCW2010.html.

Hinckley, Ken et al; Pen + Touch = New Tools; UIST'10; Oct. 3, 2010; New York, New York; http://research.microsoft.com/en-us/um/people/awilson/publications/HinckleyUIST2010/HinckleyUIST2010.html.

Kane, Shaun K. et al; Bonfire: A Nomadic System for Hybrid Laptop-Tabletop Interaction; UIST'09; http://dub.washington.edu/—10 pages.

Linder, Natan et al; LuminAR: Portable Robotic Augmented Reality Interface Design and Prototype; UIST10, Oct. 3, 2010; http://fluid.media.mit.edu/sites/default/files/2010-10-03-luminar_uist10_demo.pdf.

Melanson, Donald; Microsoft Research Working on Portable Surface; Mar. 2, 2010; http://www.engadget.com/2010/03/02/microsoft-research-working-on-portable-surface/.

Melanson, Donald; Wiimote Repurposed for Multi-Point Interactive Whiteboard; Dec. 10, 2007; http://www.engadget.com/2007/12/10/wiimote-repurposed-for-multi-point-interactive-whiteboard/.

Junuzovic, Sasa et al., Microsoft Research, IllumiShare, 2012, pp. 1-2, Microsoft. http://delivery.acm.org/.

Simonite, Tom; A Kitchen Countertop With a Brain; MIT Technology Review; Jul. 2, 2010; http://www.technologyreview.com/news/419639/a-kitchen-countertop-with-a-brain/.

Wilson, Andrew D. et al; Combining Multiple Depth Cameras and Projectors for Interactions on, Above, and Between Surfaces; UIST'10; Oct. 3, 2010; New York, New York; http://research.microsoft.com/en-us/um/people/awilson/publications/WilsonUIST2010/WilsonUIST2010.html.

Wilson, Andrew D.; Using a Depth Camera As a Touch Sensor; ITS 2010: Devices & Algorithms; Nov. 7, 2010; Saarbrucken, Germany; http://research.microsoft.com/en-us/um/people/awilson/publications/WilsonITS2010/WilsonITS2010.html.

* cited by examiner

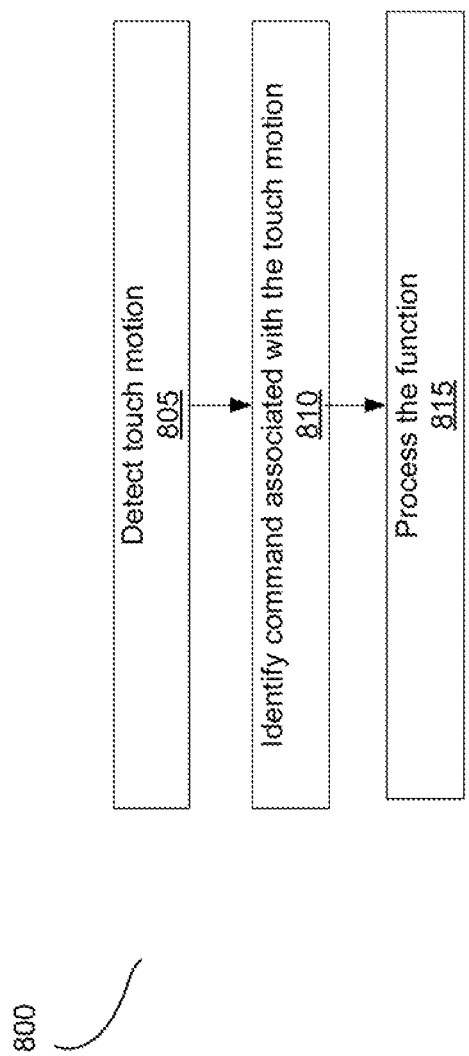

PROJECTION SYSTEM MANAGER

BACKGROUND

Computer systems typically employ a display or multiple displays which are mounted on a support stand and/or are incorporated into some other component of the computer system. For displays employing touch sensitive technology (e.g., touch screens), it is often desirable for a user to interact directly with such displays in order to fully utilize such touch technology during system operations. Touch sensitive technology may include interactive surfaces that allow users to manipulate digital content in new ways, beyond what is possible with the desktop computer. There are many compelling aspects to such systems—for example the interactions the user can have to manipulate objects directly with fingers and hands. Some systems may allow further functionalities by associating tangible objects with the digital interface, leveraging the user's skills from the real world to interact in the digital.

BRIEF DESCRIPTION OF THE DRAWINGS

Example implementations are described in the following detailed description and in reference to the drawings, in which:

FIG. 8 is an example process flow diagram in accordance with the principles disclosed herein.

DETAILED DESCRIPTION

Figure 1:
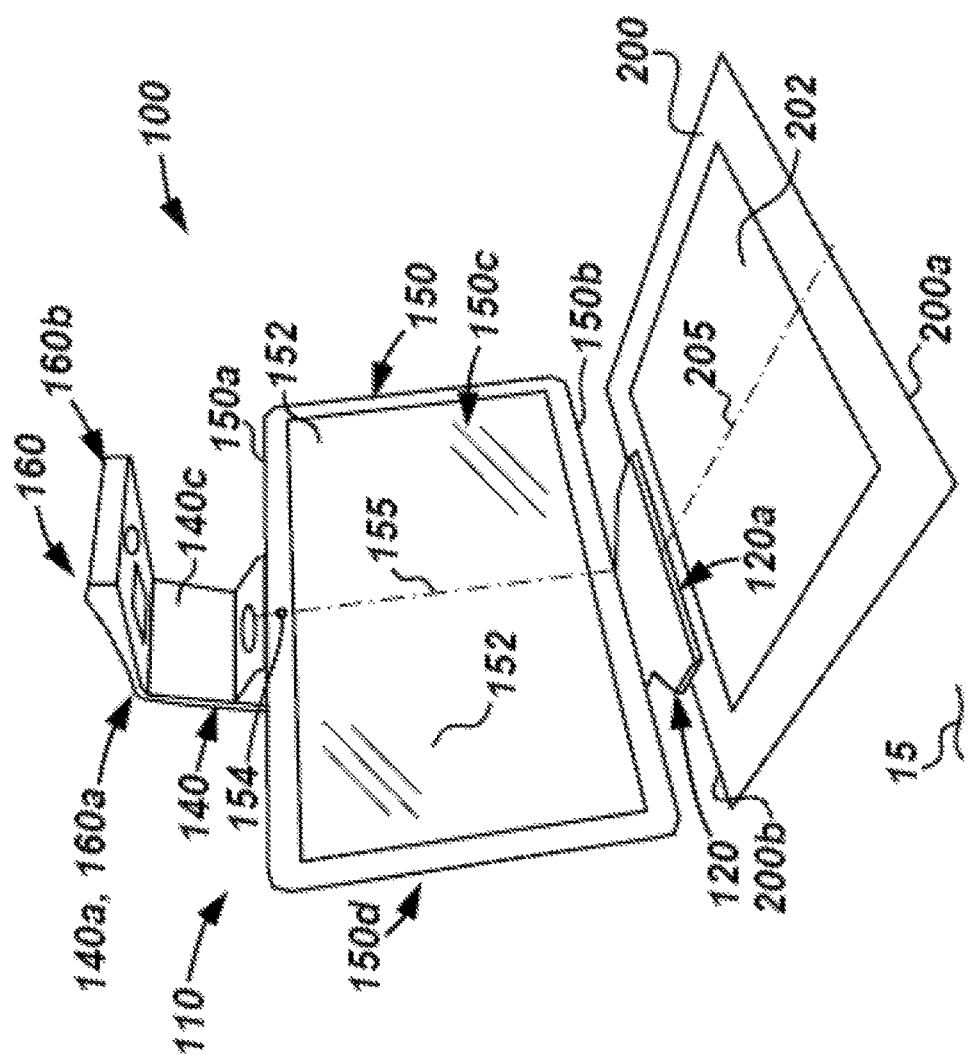
FIG. 1 illustrates a schematic perspective view of an example of a computer system in accordance with the principles disclosed herein.
Figure 2:
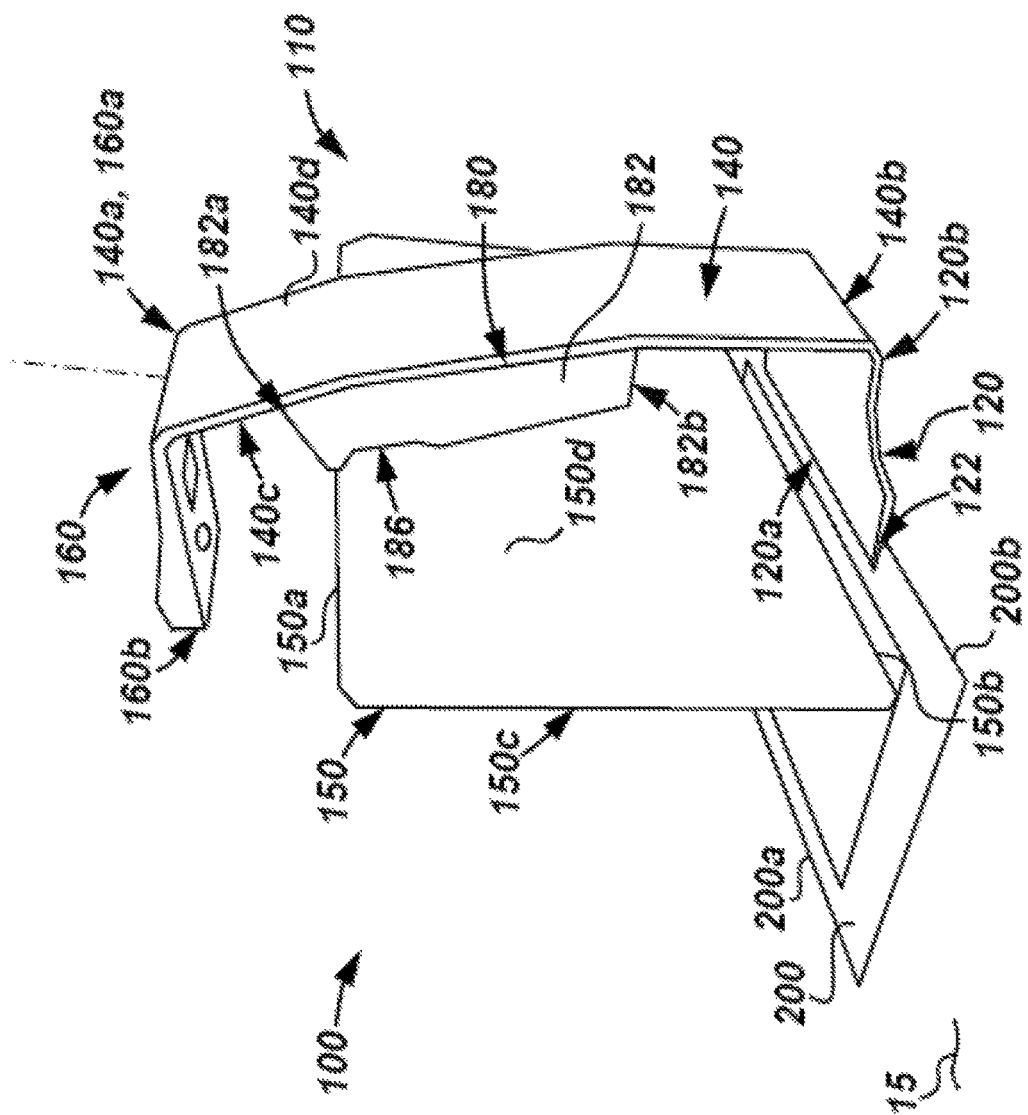
FIG. 2 illustrates another schematic perspective view of the computer system of FIG. 1 in accordance with the principles disclosed herein.

Various implementations described herein are directed to interacting with a projection computing system. More specifically, and as described in greater detail below, various aspects of the present disclosure are directed to a manner by which a touch motion that is performed outside of a projector display area is identified to control the projection computing system.

Aspects of the present disclosure described herein implement a system with a projector unit and computer that uses cameras that have a field of view wider than the projector display area. According to various aspects of the present disclosure, the approach described herein allows a user to utilize space outside of a projector display area to interact with the system. Accordingly, the approach described herein allows a user to control the system without having to interfere with the projected image.

Moreover, aspects of the present disclosure described herein also disclose detecting a user's touch motion outside of a projector display area. Among other things, this approach allows the user to define additional commands using areas other than the projection display area and manage the system through additional functionality. Accordingly, this approach advantageously provides a larger set of functions that can be interpreted in a more flexible manner.

In one example in accordance with the present disclosure, a system is provided. The system comprises a base, an upright member extending upward from the base, and a cantilevered top extending outward from the upright member, a projector unit attachable to the upright member, an all-in-one computer attachable to the projector unit, and a touch sensitive mat communicatively coupled to the all-in-one computer. The projector unit is to project an image upward to reflect off the mirror and on to a projector display area on the touch sensitive mat, and the cantilevered top includes a camera communicatively coupled to the all-in-one computer, the camera having lens with a field of view wider than the projector display area.

In another example in accordance with the present disclosure, another system is provided. The system comprises a projector unit to project an image on to a projector display area on a touch sensitive mat, an all-in-one computer attachable to the projector unit, and a camera communicatively coupled to the all-in-one computer, the camera having a lens with a field of view wider than the projector display area. The touch sensitive mat communicatively coupled to the all-in-one computer.

In a further example in accordance with the present disclosure, a method for managing a projection system is provided. The method comprises detecting a touch motion in an area outside a projection display area, identifying a command associated with the touch motion, and processing the command without interfering with an image being displayed on the projection display area.

Referring now to FIGS. 1-4, a computer system 100 in accordance with the principles disclosed herein is shown. In this example, system 100 generally comprises a support structure 110, a computing device 150, a projector unit 180, and a touch sensitive mat 200. Computing device 150 may comprise any suitable computing device while still complying with the principles disclosed herein. For example, in some implementations, device 150 may comprise an electronic display, a smartphone, a tablet, an all-in-one computer (i.e., a display that also houses the computer's board), or some combination thereof. In this example, device 150 is an all-in-one computer that includes a central axis or center line 155, first or top side 150*a*, a second or bottom side 150*b* axially opposite the top side 150*a*, a front side 150*c* extending axially between the sides 150*a*, 150*b*, a rear side also extending axially between the sides 150*a*, 150*b* and generally radially opposite the front side 150*c*. A display 152 defines a viewing surface and is disposed along the front side 150*c* to project images for viewing and interaction by a user (not shown). In some examples, display 152 includes touch sensitive technology such as, for example, resistive, capacitive, acoustic wave, infrared (IR), strain gauge, optical, acoustic pulse recognition, or some combination thereof. Therefore, throughout the following description, display 152 may periodically be referred to as a touch sensitive surface or display. In addition, in some examples, device 150 further includes a camera 154 that is to take images of a user while he or she is positioned in front of display 152. In some implementations, camera 154 is a web camera. Further, in some examples, device 150 also includes a microphone or similar device that is arranged to receive sound inputs (e.g., voice) from a user during operation.

Referring still to FIGS. 1-4, support structure 110 includes a base 120, an upright member 140, and a top 160. Base 120 includes a first or front end 120a, and a second or rear end 120b. During operation, base 120 engages with a support surface 15 to support the weight of at least a portion of the components (e.g., member 140, unit 180, device 150, top 160, etc.) of system 100 during operation. In this example, front end 120a of base 120 includes a raised portion 122 that is slightly separated above the support surface 15 thereby creating a space or clearance between portion 122 and surface 15. As will be explained in more detail below, during operation of system 100, one side of mat 200 is received within the space formed between portion 122 and surface 15 to ensure proper alignment of mat 200. However, it should be appreciated that in other examples, other suitable alignments methods or devices may be used while still complying with the principles disclosed herein.

Upright member 140 includes a first or upper end 140a, a second or lower end 140b opposite the upper end 140a, a first or front side 140c extending between the ends 140a, 140b, and a second or rear side 140d opposite the front side 140c and also extending between the ends 140a, 140b. The lower end 140b of member 140 is coupled to the rear end 120b of base 120, such that member 140 extends substantially upward from the support surface 15.

Top 160 includes a first or proximate end 160a a second or distal end 160b opposite the proximate end 160a, a top surface 160c extending between the ends 160a, 160b, and a bottom surface 160d opposite the top surface 160c and also extending between the ends 160a, 160b. Proximate end 160a of top 160 is coupled to upper end 140a of upright member 140 such that distal end 160b extends outward therefrom. As a result, in the example shown in FIG. 2, top 160 is supported at end 160a and thus is referred to herein as a "cantilevered" top. In some examples, base 120, member 140, and top 160 are all monolithically formed; however, it should be appreciated that in other example, base 120, member 140, and/or top 160 may not be monolithically formed while still complying with the principles disclosed herein.

Referring still to FIGS. 1-4, mat 200 includes a central axis or centerline 205, a first or front side 200a, and a second or rear side 200b axially opposite the front side 200a. In this example, a touch sensitive surface 202 is disposed on mat 200 and is substantially aligned with the axis 205. Surface 202 may comprise any suitable touch sensitive technology for detecting and tracking one or multiple touch inputs by a user in order to allow the user to interact with software being executed by device 150 or some other computing device (not shown). For example, in some implementations, surface 202 may utilize known touch sensitive technologies such as, for example, resistive, capacitive, acoustic wave, infrared, strain gauge, optical, acoustic pulse recognition, or some combination thereof while still complying with the principles disclosed herein. In addition, in this example, surface 202 extends over a portion of mat 200; however, it should be appreciated that in other examples, surface 202 may extend over substantially all of mat 200 while still complying with the principles disclosed herein.

During operation, mat 200 is aligned with base 120 of structure 110, as previously described to ensure proper alignment thereof. In particular, in this example, rear side 200b of mat 200 is placed between the raised portion 122 of base 120 and support surface 15 such that rear end 200b is aligned with front side 120a of base, thereby ensuring proper overall alignment of mat 200, and particularly surface 202, with other components within system 100. In some examples, mat 200 is aligned with device 150 such that the center line 155 of device 150 is substantially aligned with center line 205 of mat 200; however, other alignments are possible. In addition, as will be described in more detail below, in at least some examples surface 202 of mat 200 and device 150 are electrically coupled to one another such that user inputs received by surface 202 are communicated to device 150. Any suitable wireless or wired electrical coupling or connection may be used between surface 202 and device 150 such as, for example, BLUETOOTH®, ultrasonic, electrical cables, electrical leads, electrical spring-loaded pogo pins with magnetic holding force, or some combination thereof, while still complying with the principles disclosed herein. In this example, exposed electrical contacts disposed on rear side 200b of mat 200 engage with corresponding electrical pogo-pin leads within portion 122 of base 120 to transfer signals between device 150 and surface 202 during operation. In addition, in this example, the electrical contacts are held together by adjacent magnets located in the clearance between portion 122 of base 120 and surface 15, previously described, to magnetically attract and hold (e.g., mechanically) a corresponding ferrous and/or magnetic material disposed along rear side 200b of mat 200.

Figure 3:
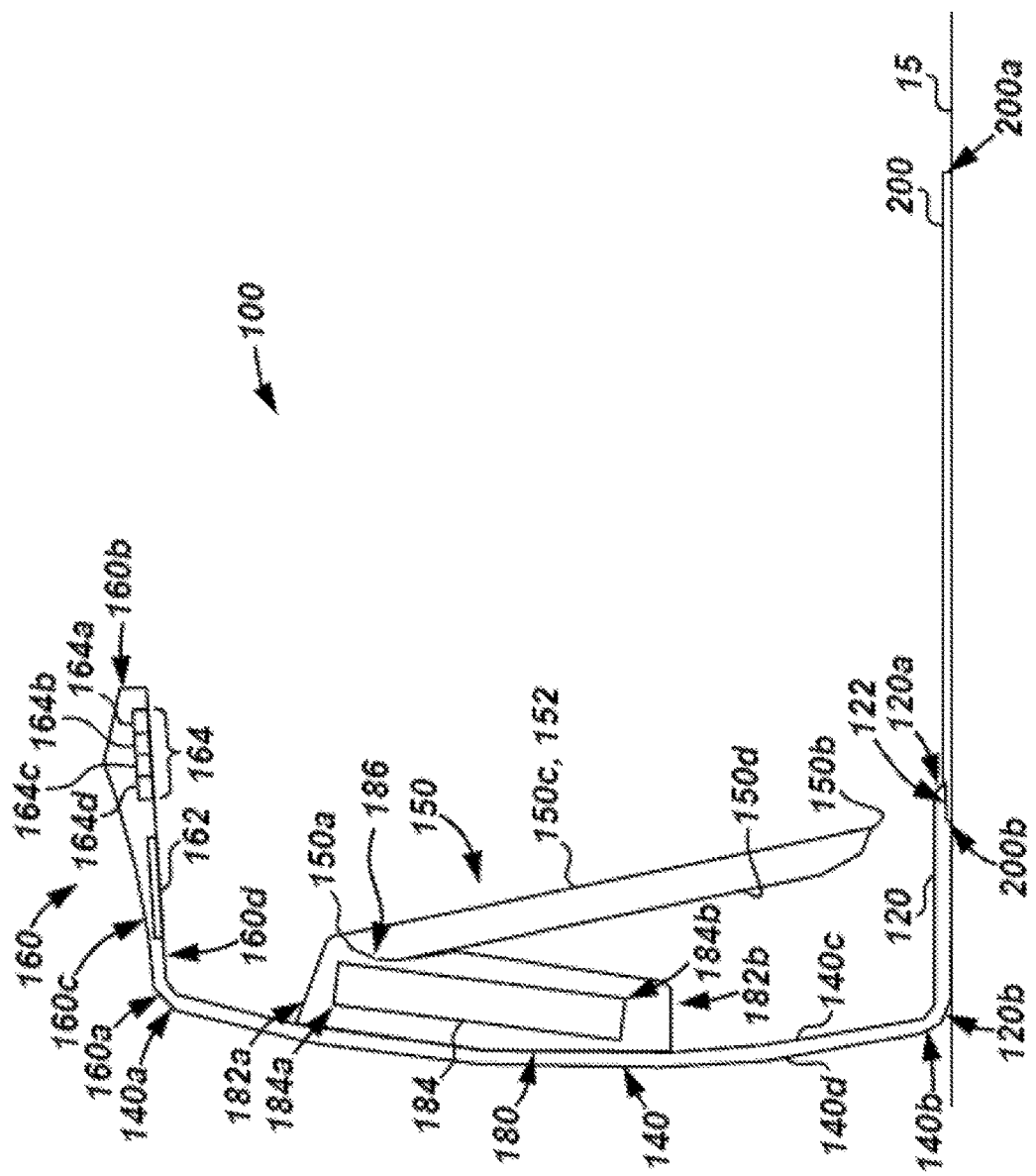
FIG. 3 is a schematic side view of the computer system of FIG. 1 in accordance with the principles disclosed herein.

Referring specifically now to FIG. 3, projector unit 180 comprises an outer housing 182, and a projector assembly 184 disposed within housing 182. Housing 182 includes a first or upper end 182a, a second or lower end 182b opposite the upper end 182a, and an inner cavity 183. In this implementation, housing 182 further includes a coupling or mounting member 186 to engage with and support device 150 during operations. In general member 186 may be any suitable member or device for suspending and supporting a computer device (e.g., device 150) while still complying with the principles disclosed herein. For example, in some implementations, member 186 comprises hinge that includes an axis of rotation such that a user (not shown) may rotate device 150 about the axis of rotation to attain an optimal viewing angle therewith. Further, in some examples, device 150 is permanently or semi-permanently attached to housing 182 of unit 180. For example, in some implementations, the housing 180 and device 150 are integrally and/or monolithically formed as a single unit.

Figure 4:
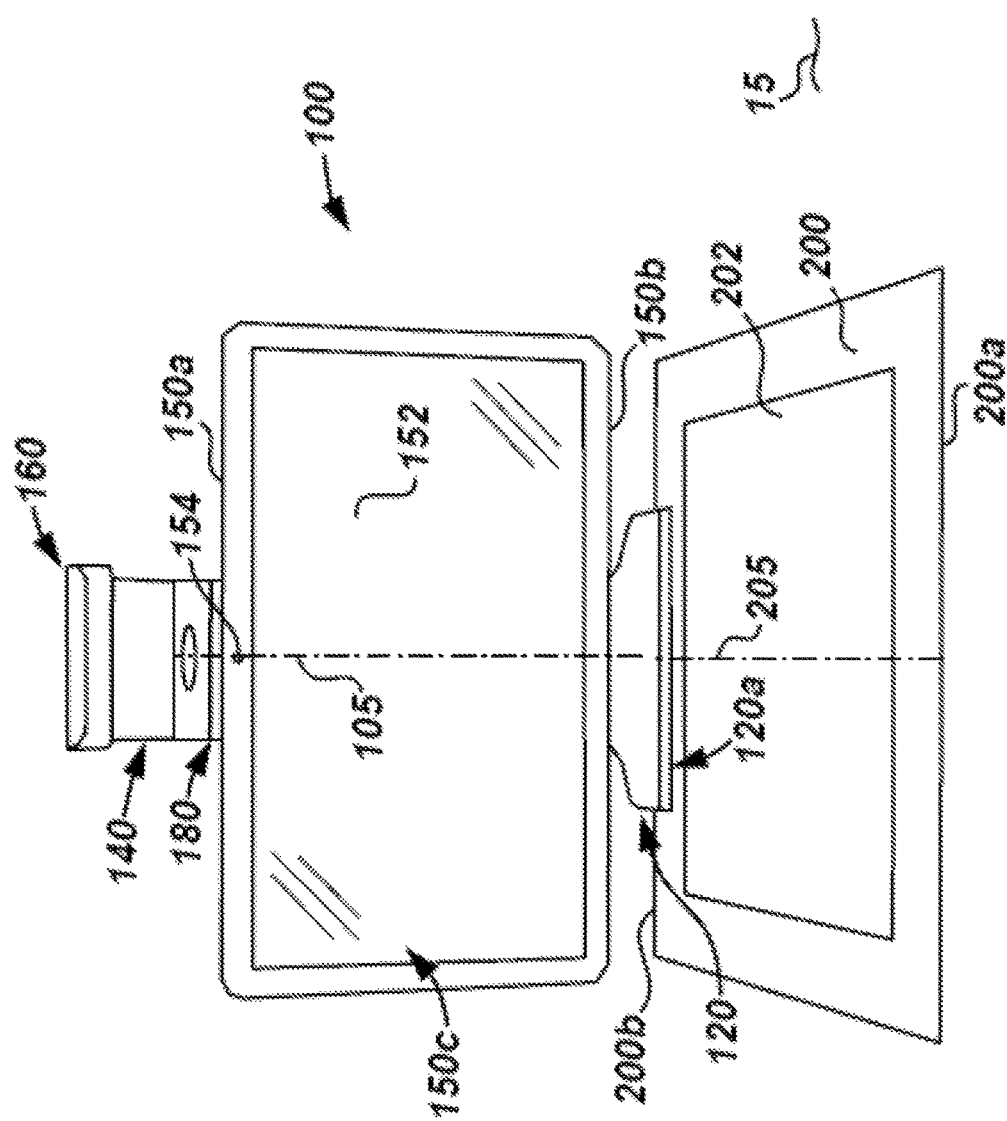
FIG. 4 is a schematic front view of the computer system of FIG. 1 in accordance with the principles disclosed herein.

Thus, referring briefly to FIG. 4, when device 150 is suspended from structure 110 through the mounting member 186 on housing 182, projector unit 180 (i.e., both housing 182 and assembly 184) is substantially hidden behind device 150 when system 100 is viewed from a viewing surface or viewing angle that is substantially facing display 152 disposed on front side 150c of device 150. In addition, as is also shown in FIG. 4, when device 150 is suspended from structure 110 in the manner described, projector unit 180 (i.e., both housing 182 and assembly 184) and any image projected thereby is substantially aligned or centered with respect to the center line 155 of device 150.

Projector assembly 184 is generally disposed within cavity 183 of housing 182, and includes a first or upper end 184a, a second or lower end 184b opposite the upper end 184a. Upper end 184a is proximate upper end 182a of housing 182 while lower end 184b is proximate lower end 182b of housing 182. Projector assembly 184 may comprise any suitable digital light projector assembly for receiving data from a computing device (e.g., device 150) and projecting an image or images (e.g., out of upper end 184a) that correspond with that input data. For example, in some implementations, projector assembly 184 comprises a digital light processing (DLP) projector or a liquid crystal on silicon (LCoS) projector which are advantageously compact and power efficient projection engines capable of multiple display resolutions and sizes, such as, for example, standard XGA (1024×768) resolution 4:3 aspect ratio or standard WXGA (1280×800) resolution 16:10 aspect ratio. Projector assembly 184 is further electrically coupled to device 150 in order to receive data therefrom for producing light and images from end 184a during operation. Projector assembly 184 may be electrically coupled to device 150 through any suitable type of electrical coupling while still complying with the principles disclosed herein. For example, in some implementations, assembly 184 is electrically coupled to device 150 through an electric conductor, WI-FI, BLUETOOTH®, an optical connection, an ultrasonic connection, or some combination thereof. In this example, device 150 is electrically coupled to assembly 184 through electrical leads or conductors (previously described) that are disposed within mounting member 186 such that when device 150 is suspended from structure 110 through member 186, the electrical leads disposed within member 186 contact corresponding leads or conductors disposed on device 150.

Referring still to FIG. 3, top 160 further includes a fold mirror 162 and a sensor bundle 164. Mirror 162 includes a highly reflective surface 162a that is disposed along bottom surface 160d of top 160 and is positioned to reflect images and/or light projected from upper end 184a of projector assembly 184 toward mat 200 during operation. Mirror 162 may comprise any suitable type of mirror or reflective surface while still complying with the principles disclosed herein. In this example, fold mirror 162 comprises a standard front surface vacuum metalized aluminum coated glass mirror that acts to fold light emitted from assembly 184 down to mat 200. In other examples, mirror 162 could have a complex aspherical curvature to act as a reflective lens element to provide additional focusing power or optical correction.

Sensor bundle 164 includes a plurality of sensors and/or cameras to measure and/or detect various parameters occurring on mat 200 during operation. For example, in the specific implementation depicted in FIG. 3, bundle 164 includes an ambient light sensor 164a, a camera (e.g., a color camera) 164b, a depth sensor or camera 164c, and a three dimensional (3D) user interface sensor 164d. Ambient light sensor 164a is arranged to measure the intensity of light of the environment surrounding system 100, in order to, in some implementations, adjust the camera's and/or sensor's (e.g., sensors 164a, 164b, 164c, 164d) exposure settings, and/or adjust the intensity of the light emitted from other sources throughout system such as, for example, projector assembly 184, display 152, etc. Camera 164b may, in some instances, comprise a color camera which is arranged to take either a still image or a video of an object and/or document disposed on mat 200. Depth sensor 164c generally indicates when a 3D object is on the work surface. In particular, depth sensor 164c may sense or detect the presence, shape, contours, motion, and/or the 3D depth of an object (or specific feature(s) of an object) placed on mat 200 during operation. Thus, in some implementations, sensor 164c may employ any suitable sensor or camera arrangement to sense and detect a 3D object and/or the depth values of each pixel (whether infrared, color, or other) disposed in the sensor's field-of-view (FOV). For example, in some implementations sensor 164c may comprise a single infrared (IR) camera sensor with a uniform flood of IR light, a dual IR camera sensor with a uniform flood of IR light, structured light depth sensor technology, time-of-flight (TOF) depth sensor technology, or some combination thereof. User interface sensor 164d includes any suitable device or devices (e.g., sensor or camera) for tracking a user input device such as for example, a hand, stylus, pointing device, etc. In some implementations, sensor 164d includes a pair of cameras which are arranged to stereoscopically track the location of a user input device (e.g., a stylus) as it is moved by a user about the matt 200. In other examples, sensor 164d may also or alternatively include an infrared cameras) or sensor(s) that is arranged to detect infrared light that is either emitted or reflected by a user input device. It should further be appreciated that bundle 164 may comprise other sensors and/or cameras either in lieu of or in addition to sensors 164a, 164b, 164c, 164d, previously described. In addition, as will explained in more detail below, each of the sensors 164a, 164b, 164c, 164d within bundle 164 is electrically and communicatively coupled to device 150 such that data generated within bundle 164 may be transmitted to device 150 and commands issued by device 150 may be communicated to the sensors 164a, 164b, 164c, 164d during operations. As is explained above for other components of system 100, any suitable electrical and/or communicative coupling may be used to couple sensor bundle 164 to device 150 such as for example, an electric conductor, WI-FI, BLUETOOTH®, an optical connection, an ultrasonic connection, or some combination thereof. In this example, electrical conductors are routed from bundle 164, through top 160, upright member 140, and projector unit 180 and into device 150 through the leads that are disposed within mounting member 186, previously described.

Figure 5:
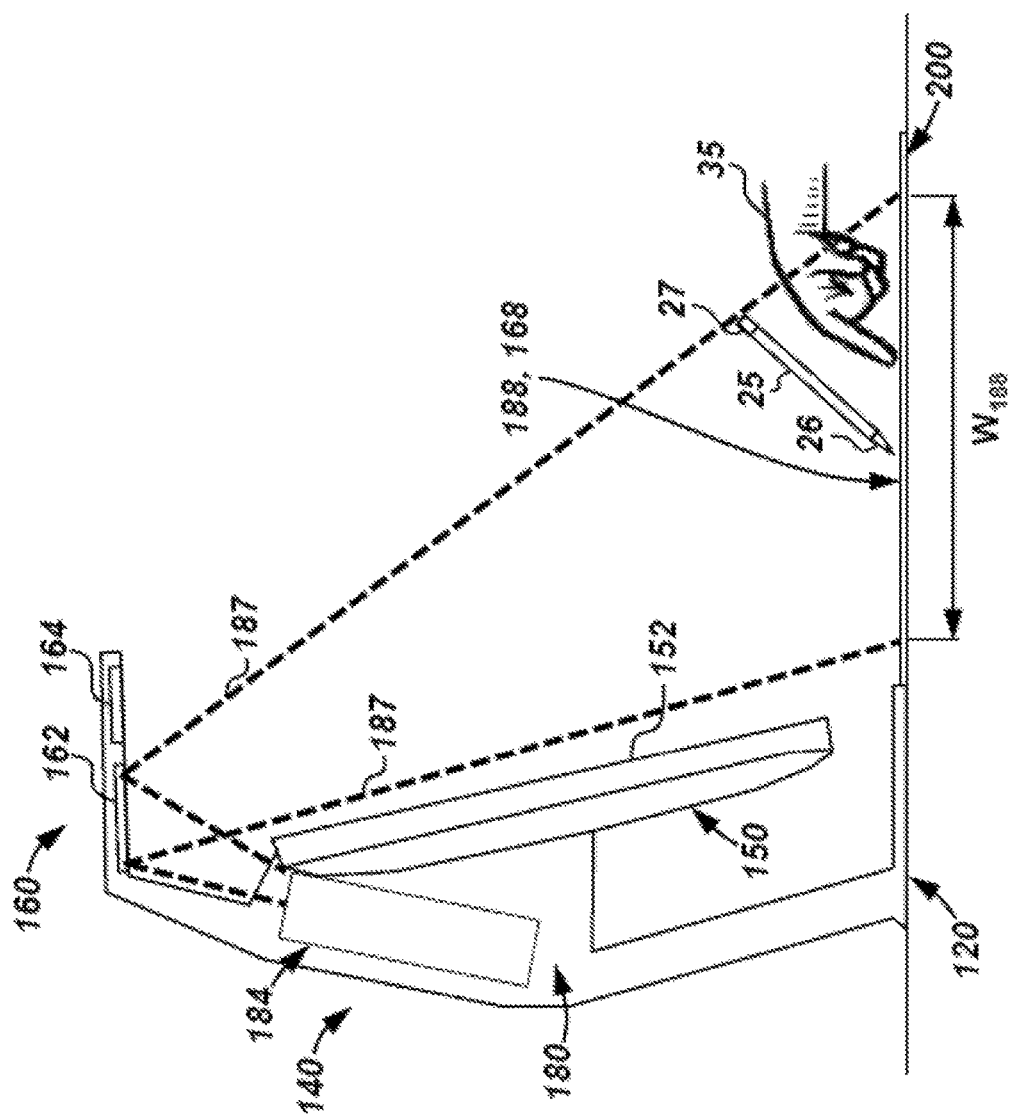
FIG. 5 is a schematic side view of the computer system of FIG. 1 during operation in accordance with the principles disclosed herein.
Figure 6:
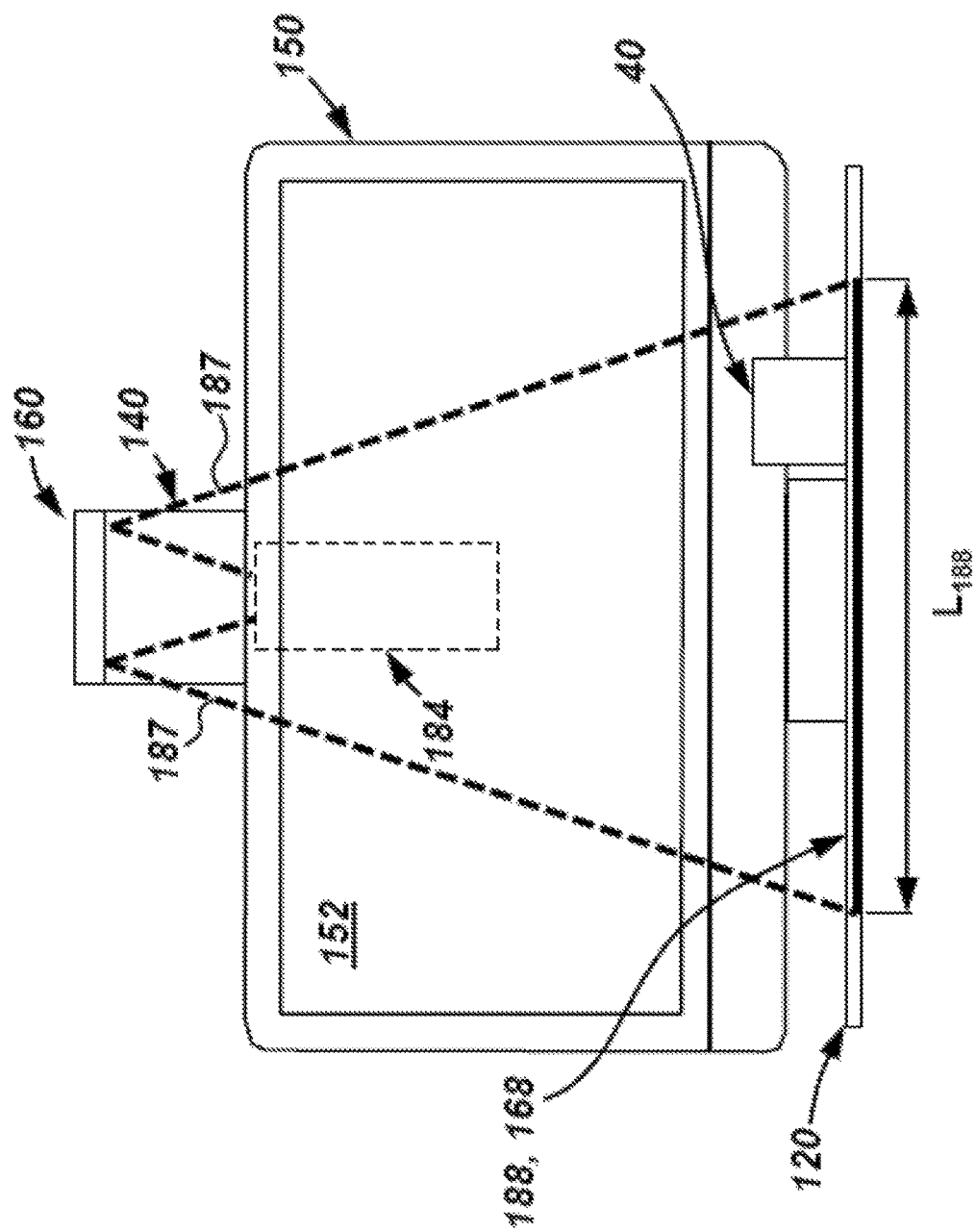
FIG. 6 is a schematic front view of the system of FIG. 1 during operation in accordance with the principles disclosed herein.

Referring now to FIGS. 5 and 6, during operation of system 100, light 187 is emitted from projector assembly 184, and reflected off of mirror 162 towards mat 200 thereby displaying an image on a projector display space 188. In this example, space 188 is substantially rectangular and is defined by a length $L_{188}$ and a width $W_{188}$. In some examples length $L_{188}$ may equal approximately 16 inches, while width $W_{188}$ may equal approximately 12 inches; however, it should be appreciated that other values for both length $L_{188}$ and width $W_{188}$ may be used while still complying with the principles disclosed herein. In addition, the sensors (e.g., sensors 164a, 164b, 164c, 164d) within bundle 164 include a sensed space 168 that is larger than projector display space 188, previously described. Sensed space 168 defines the area that the sensors within sensor bundle 164 are arranged to monitor and/or detect the conditions thereof in the manner previously described. More specifically, sensor bundle 164 includes infrared or visible cameras that have a lens configuration with a field of view wider than the touch sensitive area 202. Accordingly, the cameras may track the location of the user input device in an area that is wider than surface 202. In some examples, sensed space 168 coincide or correspond with touch sensitive surface 202 of mat 200, previously described, to effectively integrate the functionality of the touch sensitive surface 202 and sensor bundle 164 within a defined area. For example, the cameras track the location of the user input device on touch sensitive surface 202 of mat 200.

Figure 7:
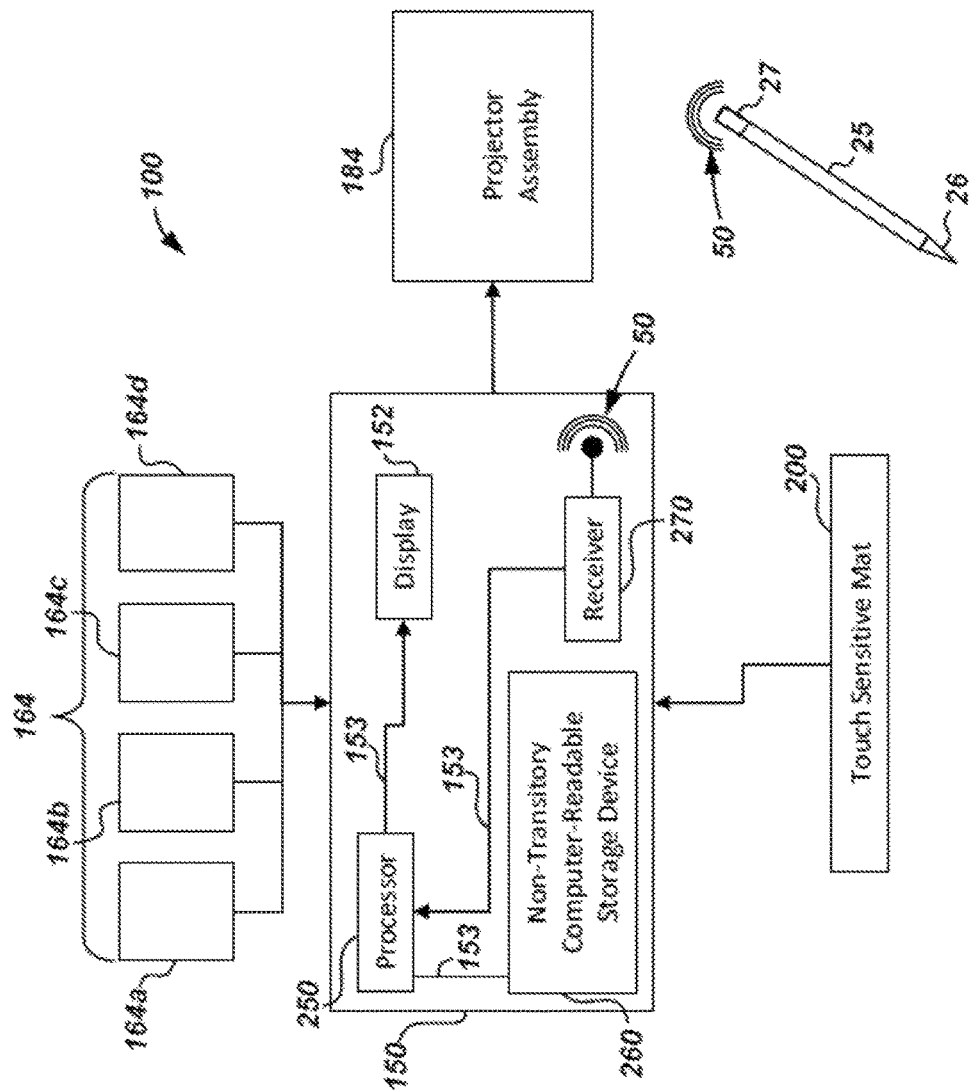
FIG. 7 is a black box circuit diagram of the computer system of FIG. 1 in accordance with the principles disclosed herein.

Referring now to FIGS. 5-7, in some examples, device 150 directs assembly 184 to project an image onto surface 202 of mat 200. In addition, device 150 may also display an image on the display 152 (which may or may not be the same as the image projected onto surface 202 by assembly 184). The image projected by assembly 184 may comprise information and/or images produced by software executing within device 150. A user (not shown) may then interact with the image displayed on projector display space 188 and display 152 by physically engaging touch sensitive surface 202 of mat 200. Such interaction may take place through any suitable method such as, direct interaction with a users hand 35, through a stylus 25, or other suitable user input device(s). The user may interact with the image displayed on projector display space 188 by touch actions outside of the projector display space 188 on touch sensitive surface 202 of mat 200.

In particular, this provides additional functionality. For example, the touch action may act as a scroll bar. More specifically, a user input device (e.g., a hand, stylus, pointing device) may move up and down in the area outside of projector display space 188. In another example, the touch action may be custom button for various functionalities such as, but not limited to, adjusting the brightness of a display, adjusting the volume, activation or termination of operating system (e.g., start button). Such touch actions may be performed without interfering with the image on projector display space 188.

As best shown in FIG. 7, when a user interacts with surface 202 of mat 200, a signal is generated which is routed to device 150 through any of the electrical coupling methods and devices previously described. As discussed above, this interaction may be outside projector display space 188 within mat 200. Once device 150 receives the signal generated within mat 200, it is routed, through internal conductor paths 153, to a processor 250. In one implementation, processor 250 communicates with a non-transitory computer-readable storage medium 260 to generate an output signal which is then routed back to projector assembly 184 and/or display 152 to implement a change in the image projected onto surface 202 and/or the image displayed on display 152, respectively. In another implementation, processor 250 may identify the signal generated within mat 200. More specifically, the signal generated within may 200 may be associated with a specific functionality (e.g., increase volume, dim brightness, scroll down, etc.). Accordingly, once the processor 250 receives the signal and identifies the functionality, it may perform the task corresponding to the user touch action/interaction. It should also be appreciated that during this process, a user may also be interacting directly or indirectly with the image displayed on display 152 through engagement with the touch sensitive surface disposed on touch sensitive area 202.

In addition, in some examples, stylus 25 further includes a transmitter 27 that is arranged to track the position of stylus 25 (whether or not stylus 25 is interacting with touch sensitive surface 202) in or outside of projector display space 188 and to communicate with a receiver 270 disposed within device 150 through a wireless signal 50. In these examples, input received by receiver 270 from transmitter 27 on stylus 25 is also routed through paths 153 to processor 250 such that an output signal may be generated and routed to the assembly 184 and/or the display 152 as previously described.

Further, in some examples, the sensors disposed within sensor bundle 164 (e.g., sensors 164a, 164b, 164c, 164d) may also generate system input which is routed to device 150 for further processing by processor 250 and device 260. For example, in some implementations, the sensors within sensor bundle 164 may sense the location and/or presence of a user's hand 35 or stylus 25 and then generate an input signal which is routed to processor 250. In one implementation, processor 250 identifies a task associated with the input signal and performs the task. In another implementation, processor 250 generates a corresponding output signal which is routed to display 152 and/or projector assembly 184 in the manner described above. In particular, in some implementations, sensor bundle 164 includes a pair of cameras or sensors that are arranged to perform stereoscopic stylus tracking (e.g., of stylus 25). More specifically, such cameras or sensor may perform tracking in an area that covers outside of projector display space 188. In still other implementations, stylus 25 includes a tip 26 that is coated in an infrared retro-reflective coating (e.g., paint), thus allowing it to serve as an infrared retro-reflector. Sensor bundle 164 (and more particularly sensors 164c or 164d) may then further include infrared cameras or sensors as previously described which detect infrared light that is reflected off of tip 26 of stylus 25 and thus track the location of tip 26 as is moves across surface 202 during operation.

As a result, in some examples, the image projected onto surface 202 by assembly 184 serves as a second or alternative touch sensitive display within system 100. In addition, interaction with the image displayed on surface 202 is further enhanced through use of the sensors (e.g., sensors 164a, 164b, 164c, 164d) disposed within bundle 164 as described above.

Still referring to FIG. 7, processor 250 may process machine-readable instructions, such as processor-readable (e.g., computer-readable) instructions. The machine-readable instructions may configure processor 250 to allow the system 100 to perform the methods and functions disclosed herein.

The machine-readable instructions may be stored in a memory, such as a non-transitory computer-usable medium, coupled to processor 250 and may be in the form of software, firmware, hardware, or a combination thereof. In a hardware solution, the machine-readable instructions may be hard coded as part of processor 250, e.g., an application-specific integrated circuit (ASIC) chip. In a software or firmware solution, the instructions may be stored for retrieval by processor 250. Some additional examples of non-transitory computer-usable media may include static or dynamic random access memory (SRAM or DRAM), read-only memory (ROM), electrically erasable programmable ROM (EEPROM) memory, such as flash memory, magnetic media and optical media, whether permanent or removable, etc. Some consumer-oriented computer applications are software solutions provided to the user in the form of downloads, e.g., from the Internet, or removable computer-usable non-transitory media, such as a compact disc read-only memory (CD-ROM) or digital video disc (DVD). Storage device 260 may store digital image data (e.g., bitmaps, PDFs, TIFFS, JPEGs, etc.) corresponding to (e.g., representing) the data-bearing media disclosed herein.

Referring still to FIGS. 5-7, in addition, during operation of at least some examples, system 100 may capture a two dimensional (2D) image or create a 3D scan of a physical object such that an image of the object may then be projected onto the surface 202 for further use and manipulation thereof. In particular, in some examples, an object 40 may be placed on surface 202 such that sensors (e.g., camera 164b, depth sensor 164c, etc.) within bundle 164 may detect, for instance, the location, dimensions, and in some instances, the color of object 40, to enhance a 2D image or create a 3D scan thereof. The information gathered by the sensors (e.g., sensors 164b, 164c) within bundle 164 may then be routed to processor 250 which communicates with device 260 as previously described. Thereafter, processor 250 directs projector assembly 184 to project an image of the object 40 onto the surface 202. It should also be appreciated that in some examples, other objects such as documents or photos may also be scanned by sensors within bundle 164 in order to generate an image thereof which is projected onto surface 202 with assembly 184. In addition, in some examples, once an object(s) is scanned by sensors within bundle 164, the background of the image may be optionally, digitally removed within the resulting image projected onto surface 202 for shown on display 152 of device 150). Thus, in some examples, images of physical objects (e.g., object 40) may be captured, digitized, and displayed on surface 202 during operation to quickly and easily create a digital version of a physical object to allow for further manipulation thereof consistent with the manner described herein.

While device 150 has been described as an all-in-one computer, it should be appreciated that in other examples, device 150 may further employ the use of more traditional user input devices such as, for example, a keyboard and a mouse. In addition, while sensors 164a, 164b, 164c, 164d within bundle 164 have been described as each representing a single sensor or camera, it should be appreciated that each of the sensors 164a, 164b, 164c, 164d may each include multiple sensors or cameras while still complying with the principles described herein. Further, while top 160 has been described herein as a cantilevered top, it should be appreciated that in other examples, top 160 may be supported at more than one point and is thus may not be cantilevered while still complying with the principles disclosed herein.

Turning now to the operation of the system 100, FIG. 8 illustrates an example process flow diagram 800 in accordance with an implementation. The process 800 depicts an example of method that may interact with a projector system. The machine-readable instructions may instruct the processor 250 to allow the system 100 to perform the process 800 as illustrated by the flowchart in FIG. 8. In one implementation, the system 100 may perform the process 800 in response to receiving an instruction from a user to control the projection system.

The process 800 may begin at block 805, where a touch motion by a user is detected. In particular, this process may involve using cameras that have lens with a field of view wider than projector display area. In one implementation, a user touch motion may comprise a user input object moving up and down.

At block 810, the functionality associated with the touch motion is identified. For example, it may be detected that the user input object moves up and down. Such motion may correspond to, e.g., a command to adjust the brightness of the display of the system. Once identified, at block 815, the command is processed.

The present disclosure has been shown and described with reference to the foregoing exemplary implementations. Although specific examples have been illustrated and described herein it is manifestly intended that the scope of the claimed subject matter be limited only by the following claims and equivalents thereof. It is to be understood, however, that other forms, details, and examples may be made without departing from the spirit and scope of the disclosure that is defined in the following claims.

What is claimed is:

1. A system, comprising:
a support structure including a base, an upright member extending upward from the base, and a cantilevered top extending outward from the upright member;
a projector unit attachable to the upright member;
an all-in-one computer attachable to the projector unit; and
a touch sensitive mat communicatively coupled to the all-in-one computer via electrical contacts on a rear side of the touch sensitive mat engaged with corresponding electrical leads on the base that are held together by adjacent magnets, wherein the touch sensitive mat generates an electrical signal in response to detecting a touch input;
wherein the projector unit is to project an image upward to reflect off the mirror and on to a projector display area on the touch sensitive mat; and
wherein the cantilevered top includes a fold mirror, and a camera communicatively coupled to the all-in-one computer, the camera having a lens with a field of view wider than the projector display area, wherein the camera detects a touch motion outside of the projector display area and within the touch sensitive mat that the image is projected onto, and thereby allows extended area interactions.

2. The system of claim 1, wherein the camera comprises an infrared camera which forms an image using infrared radiation.

3. The system of claim 1, wherein the camera comprises a visible camera.

4. The system of claim 1, wherein the touch motion may be exerted by the user without interfering with the image displayed on the projector display area.

5. The system of claim 1, wherein the touch motion provides additional functionality connected to operation of the all-in-one computer.

6. The system of claim 1, wherein the touch action is interpreted by identifying a function associated with the touch action.

7. The system of claim 1, wherein the cantilevered top includes a plurality of cameras, at least one camera of which is used for depth detection in areas including outside of the projector display area, and at least two cameras of which are used for stereoscopic stylus tracking in areas including outside of the projector display area.

8. A system, comprising:
a projector unit to project an image on to a projector display area on a touch sensitive mat that generates an electrical signal in response to detecting a touch input;
an all-in-one computer attachable to the projector unit, wherein the touch sensitive mat is coupled to a base of the all-in-one computer via electrical contacts on a rear side of the touch sensitive mat engaged with corresponding electrical leads on the base that are held together by adjacent magnets; and
a camera communicatively coupled to the all-in-one computer, the camera having a lens with a field of view wider than the projector display area, wherein the camera captures a touch motion performed by a user in an area outside of the projector display area and within the touch sensitive mat that the image is projected onto, the touch motion being associated with a command,
wherein the touch sensitive mat is communicatively coupled to the all-in-one computer.

9. The system of claim 8, wherein the touch sensitive mat is wider than the projector display area.

10. The system of claim 8, wherein the command comprises a function for managing the projector display area.

11. The system of claim 8, wherein the all-in-one computer is to cause the camera to scan a physical object on the touch sensitive mat and to cause the projector unit to project the scanned image back on to the projector display area.

12. A method of managing a projection system, comprising:
detecting a touch motion in an area outside a projection display area having an image that is projected onto a touch sensitive mat and within a touch sensitive surface of the touch sensitive mat via a camera that has a lens with a field of view that is wider than the projection display area, wherein the touch sensitive mat generates an electrical signal in response to detecting a touch input over an electrical contact on a rear side of the touch sensitive mat that is engaged with corresponding electrical leads on a base of an all-in-one computer that is held together by adjacent magnets;

identifying a command associated with the touch motion via as the all-in-one computer that is communicatively coupled to the touch sensitive mat and the camera; and processing the command without interfering with an image being displayed on the projection display area.

13. The method of claim 12, wherein detecting the touch motion in the area outside the projection display area further comprises detecting a stylus that includes an infrared (IR) retro-reflector and capturing movement of the stylus based on the infrared (IR) retro-reflector.

* * * * *

UNITED STATES PATENT AND TRADEMARK OFFICE
CERTIFICATE OF CORRECTION

| | | |
|---|---|---|
| PATENT NO. | : 10,114,512 B2 | Page 1 of 1 |
| APPLICATION NO. | : 15/025010 | |
| DATED | : October 30, 2018 | |
| INVENTOR(S) | : Bradley Neal Suggs | |

It is certified that error appears in the above-identified patent and that said Letters Patent is hereby corrected as shown below:

In the Claims

Column 11, Claim 12, Line 11, after "via" delete "as".

Signed and Sealed this
Fifth Day of March, 2019

Andrei Iancu
*Director of the United States Patent and Trademark Office*